US007477033B2

(12) United States Patent
Abe

(10) Patent No.: US 7,477,033 B2
(45) Date of Patent: Jan. 13, 2009

(54) ROTATION DRIVE SYSTEM HAVING A SPEED REDUCTION DEVICE WITH ELASTIC BODIES

(75) Inventor: Hiroshi Abe, Kobe (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 11/541,909

(22) Filed: Oct. 2, 2006

(65) Prior Publication Data

US 2007/0075666 A1 Apr. 5, 2007

(30) Foreign Application Priority Data

Sep. 30, 2005 (JP) ............................ 2005-287557

(51) Int. Cl.
*H02P 8/14* (2006.01)

(52) U.S. Cl. ........................... 318/433; 318/9; 318/685

(58) Field of Classification Search ................. 318/563, 318/606-611, 619, 621, 623, 632, 685, 696, 318/9-15, 430-434
See application file for complete search history.

(56) References Cited

U.S. PATENT DOCUMENTS 5,011,458 A * 4/1991 Kumm ........................ 474/49
5,729,111 A * 3/1998 Ogura et al. ................ 318/623
5,993,346 A * 11/1999 Antonov ..................... 475/258
7,218,872 B2 * 5/2007 Shimomura .................. 399/55

FOREIGN PATENT DOCUMENTS

JP 2002115751 4/2002
JP 2002171779 6/2002

* cited by examiner

*Primary Examiner*—Bentsu Ro
(74) *Attorney, Agent, or Firm*—Ditthavong Mori & Steiner, P.C.

(57) ABSTRACT

An input shaft speed signal for rotating a motor at a predetermined rotational speed is output from a rotation control unit to the motor. A rotational speed reduced by a speed reduction device with elastic bodies is detected by an output rotation sensor. A CPU obtains slippage by calculating a reduction ratio based on the detected output shaft speed signal and input shaft speed signal. Load torque is determined from the obtained slippage. A current value to be supplied to the motor is determined so that the motor produces torque corresponding to the load torque. The current value to be supplied from a motor driver to the motor is thus controlled.

11 Claims, 3 Drawing Sheets

ROTATION DRIVE SYSTEM HAVING A SPEED REDUCTION DEVICE WITH ELASTIC BODIES

BACKGROUND OF THE INVENTION

1. Field of the Invention

This invention relates to a rotation drive system having a speed reduction device with elastic bodies, and for example, relates to a rotation drive system having a speed reduction device with elastic bodies that reduce the rotational speed of a motor, which rotates a photoreceptor drum, transfer belt and other components in a copying machine and so forth, by means of frictional contact of the elastic bodies.

2. Description of Background Art

FIG. 3 is a cross-sectional view illustrating a conventional rotation drive system. This rotation drive system is disclosed in Japanese unexamined patent publication No. 2002-115751. In FIG. 3, the rotation drive system includes a motor 1, a speed reduction device 2 and a speed detection mechanism 3. The speed reduction device 2 employs a traction system (friction transmission system), which is considered advantageous in reducing the rotational variations.

An end of a rotary shaft 14 in the motor 1 acts as a sun roller 20 and makes contact with a plurality of planetary rollers 22. Each planetary roller 22 is cantilevered by a rod 28 from a carrier 23. The planetary rollers 22 are in contact with an inner surface of an internal ring 21 via elastic bodies 31 such as rubber. The rotation of the rotary shaft 14 driven by the motor 1 produces torque which is reduced by the sun roller 20, planetary rollers 22 and internal ring 21 at their reduction ratios depending on the individual external and internal diameters, and the torque is then output through the carrier 23 and an output shaft 24.

The output from the speed detection mechanism 3 is input to a controller 4. Based on a control signal from the controller 4, a drive device 5 controls the rotational speed of the motor 1. Since the planetary rollers 22 used in the speed reduction device 2 make contact with the internal ring 21 via the elastic bodies 31 which may cause generation of a delay element in a feedback control loop, the controller 4 should so control the drive device 5 as to prevent it from being uncontrollable as a result of the delay element.

For this purpose, the controller 4 adopts a feedback control as disclosed in Japanese unexamined patent publication No. 2002-171779. Specifically, a rotational speed output from the speed reduction device 2 is detected to obtain a difference value from a target speed. The controller 4 feeds a speed command signal based on the difference value to the motor 1 to directly control the motor's rotational speed, thereby reducing delay factors.

In the rotation drive system shown in FIG. 3, a motor 1 acting as a driving source is a stepper motor. The speed of the stepper motor can be controlled by controlling the number of pulses applied to the stepper motor. In addition, torque can be controlled by adjusting current passing through motor coils.

However, the application of load torque that is equal to or greater than torque produced by the motor to the stepper motor could cause a phenomenon, so-called "out-of-step", which stops the movement of the motor at the occurrence of the phenomenon and from then on. This is a drawback of the stepper motor. The term "out-of-step" herein means being out of synchronization.

In order to properly drive the stepper motor, in consideration of variations in the amount of load, the current must be set so that the motor produces torque equal to or greater than an estimated actual amount of load torque. Thus, the wide variation of the load torque requires setting a considerable amount of wasted current. The increase of the current value may adversely affect motor properties including electricity consumption, heat generation, noise, vibration, rotational variation, and so forth.

SUMMARY OF THE INVENTION

It is an object of the present invention to provide a rotation drive system having a speed reduction device with elastic bodies capable of minimizing the deterioration of the properties including electricity consumption, heat generation, noise, vibration, rotational variation, and so forth.

The rotation drive system according to the present invention has a speed reduction device with elastic bodies for reducing the rotational speed of a motor by means of frictional contact of the elastic bodies. The rotation drive system comprises rotation control unit for outputting an input shaft speed signal to the motor in order to rotate the motor at a predetermined input shaft speed, rotational speed detection unit for detecting an output shaft speed reduced by the speed reduction device with elastic bodies and outputting an output shaft speed signal, load torque estimation unit for estimating load torque based on the input shaft speed signal output from the rotation control unit and the output shaft speed signal detected by the rotational speed detection unit, and drive control unit for controlling the motor to produce torque equivalent to the load torque estimated by the load torque estimation unit.

In the present invention, load torque is estimated based on the input shaft speed signal and the detected output shaft speed signal, and the motor is controlled so as to produce torque equivalent to the estimated load torque, thereby allowing minimization of the deterioration of various properties including electricity consumption, heat generation, noise, vibration, rotational variation, and so forth.

More specifically, the rotation drive system according to the present invention further includes storing unit for storing in advance data regarding reduction ratios under no-load conditions between an input shaft speed of a motor and an output shaft speed obtained by reducing the input shaft speed through the use of the speed reduction device with elastic bodies and data regarding the relations under loaded conditions between slippage generated in the speed reduction device with elastic bodies and load torque. The load torque estimation unit calculates a reduction ratio under loaded conditions based on the input shaft speed signal and the output shaft speed signal, reads out the data of a reduction ratio under no-load conditions from the storing unit, obtains the slippage based on the reduction ratio under no-load conditions and the calculated reduction ratio, and reads out load torque corresponding to the slippage from the storing unit. The drive control unit controls current flowing from the rotation control unit to the motor so that the motor produces torque equivalent to the read out load torque.

Preferably, the load torque estimation unit estimates load torque in real time.

In the specific embodiment, the motor is a stepper motor.

DESCRIPTION OF PREFERRED EMBODIMENT

Figure 1:
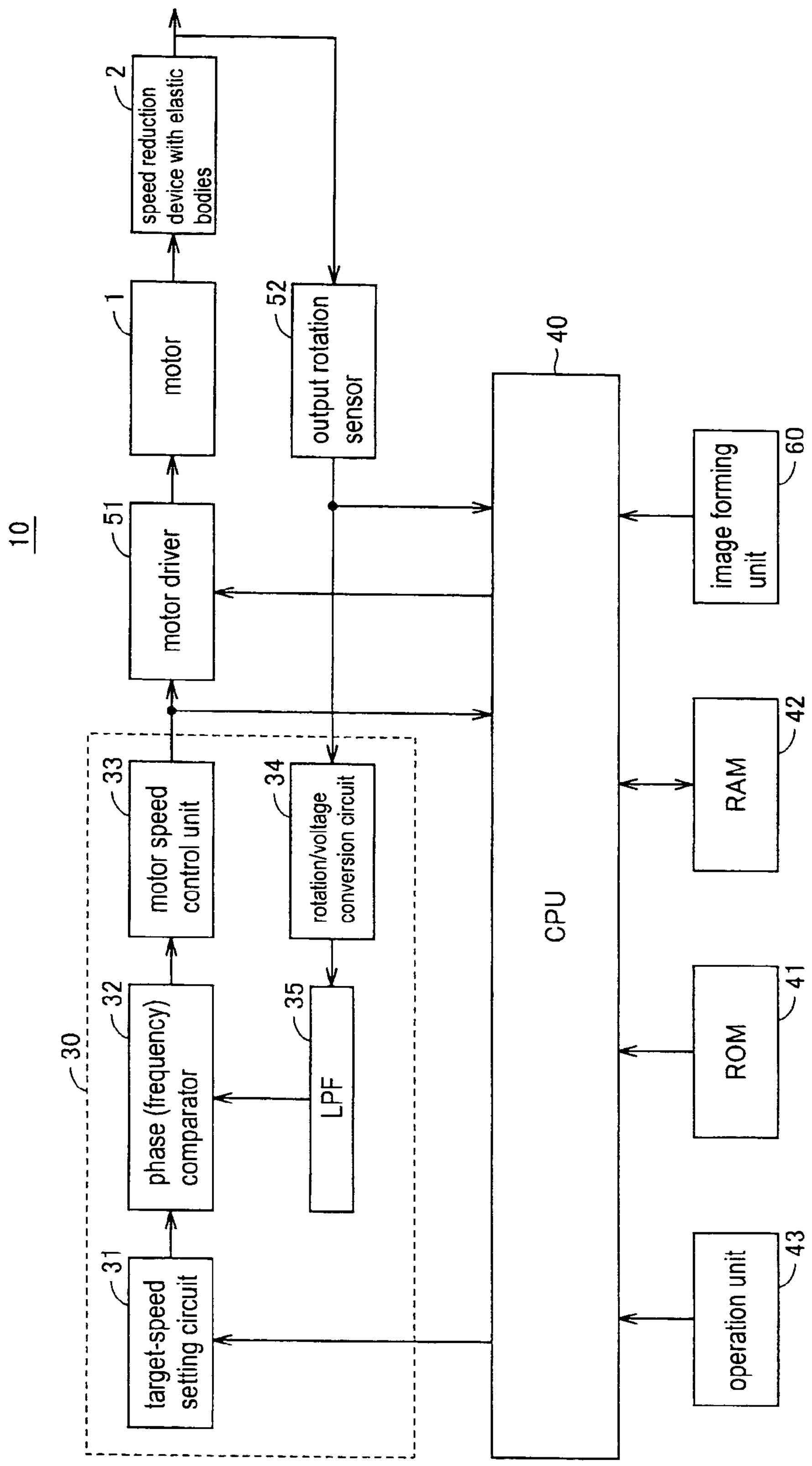
FIG. 1 is a block diagram illustrating a rotation drive system having a speed reduction device with elastic bodies according to an embodiment of the present invention.

FIG. 1 is a block diagram illustrating a principal part of an image forming apparatus including a rotation drive system using a speed reduction device with elastic bodies according to an embodiment of the present invention. In FIG. 1, an image forming apparatus 10 includes a rotation control unit 30, a CPU 40 functioning as load torque estimation unit and drive control unit, a ROM 41 functioning as storing unit, a RAM 42, and an operation unit 43. The CPU 40 exerts control over the entire image forming apparatus 10. The CPU 40 has an operation unit 43 for inputting data required for image formation and an image forming unit 60 both connected thereto. An operation of a copy key on the operation unit 43 activates the copying operations of the image forming unit 60.

Figure 3:
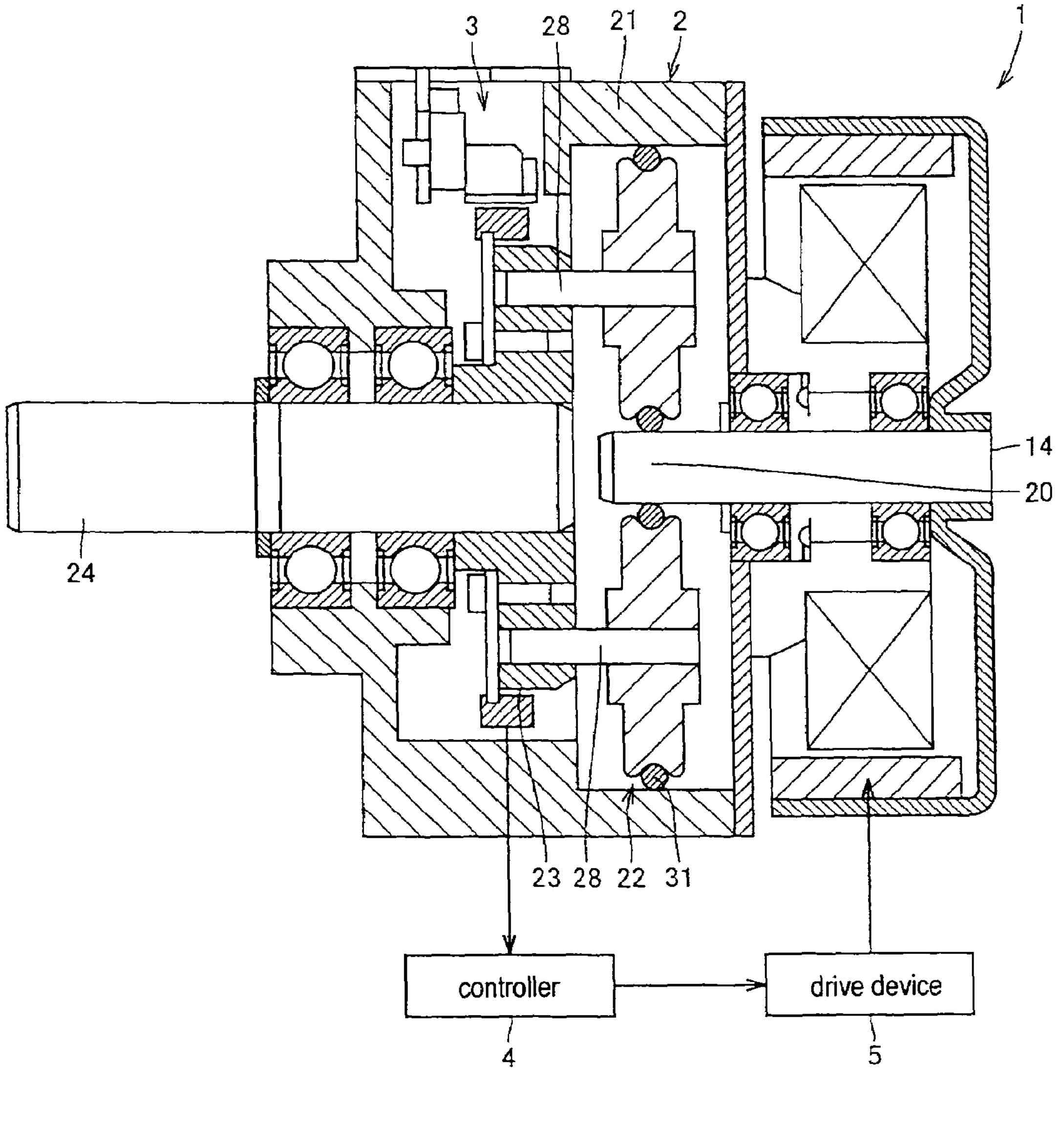
FIG. 3 is a cross-sectional view illustrating a conventional rotation drive system.

The rotation control unit 30 controls the motor 1 so as to rotate at a target speed in response to a command from the CPU 40. The motor 1 used herein is a stepper motor. A target speed signal, which is a target speed of the motor 1 during operation, is given from the CPU 40 to a target-speed setting circuit 31. The target-speed setting circuit 31 feeds a voltage signal with a frequency corresponding to the target speed to a phase (frequency) comparator 32. The phase (frequency) comparator 32 compares phases (frequencies) of the voltage signal with the frequency corresponding to the target speed and a voltage signal that is output from an LPF (low pass filter) 35 and corresponds to the rotational speed output from the speed reduction device with elastic bodies 2 shown in FIG. 3, and feeds an output signal obtained by the comparison to a motor speed control unit 33.

Based on the output from the phase (frequency) comparator 32, the motor speed control unit 33 outputs an input shaft speed signal to the CPU 40 and a motor driver 51. The motor driver 51 is also provided with a current setting signal from the CPU 40. The motor driver 51 controls the output speed of the motor 1 based on the given input shaft speed signal. Torque generated by the motor 1 is transmitted to the speed reduction device with elastic bodies 2 as discussed above in FIG. 3, and is then detected as an output rotational speed of the speed reduction device 2 by an output rotation sensor 52 functioning as rotational speed detection unit. The detected output rotational speed is given as an output shaft speed signal to the CPU 40 and a rotation/voltage conversion circuit 34. The rotation/voltage conversion circuit 34 converts the output shaft speed signal into a voltage signal.

The converted voltage signal is now given to the LPF 35, which removes high frequency components contained in the voltage signal. The high frequency components are the equivalent of the rotational speed variations generated when the elastic bodies 31 with deformed parts caused by the halts of the speed reduction device 2 return to their original shape while the motor 1 is driving again. The phase (frequency) comparator 32, rotation/voltage conversion circuit 34 and LPF 35 constitute a feedback control circuit in this embodiment; however the present invention may also be configured so as to comprise a feedforward control circuit.

As discussed above, the ROM 41 and RAM 42 are connected to the CPU 40. The ROM 41 holds data of reduction ratios of an ideal state (under no-load conditions) to various rotational speeds as well as data of the relations between previously measured slippage in the speed reduction device with elastic bodies 2 and load torque. The RAM 42 stores operation contents of the CPU 40.

Figure 2:
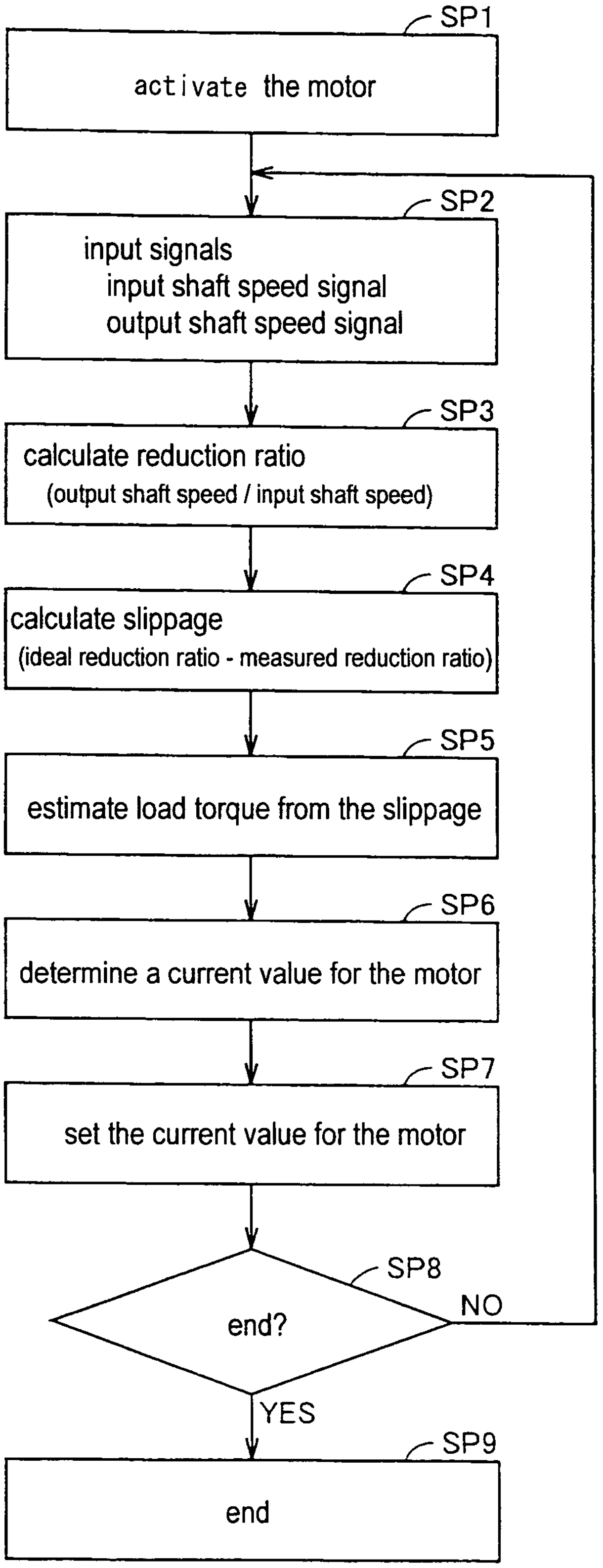
FIG. 2 is a flow chart showing the operations of the rotation drive system having a speed reduction device with elastic bodies according to the embodiment of the present invention.

FIG. 2 is a flow chart showing the operations of the rotation drive system having a speed reduction device with elastic bodies according to the embodiment of the present invention. With reference to FIG. 2, a description will be made on the specific operations of the rotation drive system shown in FIG. 1.

In step (SP for short in FIG. 2) SP1, the CPU 40 feeds a target speed signal to the target-speed setting circuit 31 of the rotation control unit 30 to activate the motor 1. The target-speed setting circuit 31 feeds a voltage signal with a frequency corresponding to the target speed to the phase (frequency) comparator 32. The phase (frequency) comparator 32 compares phases (frequencies) of the voltage signal with the frequency corresponding to the target speed and a voltage signal that is output from an LPF (low pass filter) 35 and corresponds to the rotational speed output from the speed reduction device with elastic bodies 2, and feeds an output signal obtained by the comparison to the motor speed control unit 33.

The motor speed control unit 33 outputs an input shaft speed signal to the CPU 40 and motor driver 51 based on the output from the phase (frequency) comparator 32. The motor driver 51 controls the output speed of the motor 1 based on the input shaft speed signal. Torque generated by the motor 1 is transmitted to the speed reduction device with elastic bodies 2, and is then detected as an output shaft speed of the speed reduction device 2 by the output rotation sensor 52. The detected output shaft speed is given as an output shaft speed signal to the CPU 40 and rotation/voltage conversion circuit 34.

The CPU 40 receives the input shaft speed signal and output shaft speed signal in step SP2, and subsequently obtains a reduction ratio by dividing the output shaft speed signal by the input shaft speed signal in step SP3. In step SP4, data of a reduction ratio of an ideal state (under no-load conditions) to the input shaft speed signal is read out from the ROM 41. From the difference between the read out reduction ratio and the reduction ratio obtained during rotation of the motor in step SP3, the CPU 40 figures out slippage of the currently working speed reduction device with elastic bodies 2.

Then, in step SP5, load torque is estimated from the slippage. Specifically, data regarding a relation between the previously measured slippage in the speed reduction device with elastic bodies 2 and load torque is read out from the ROM 41 to estimate load torque corresponding to the calculated slippage. The estimation of the load torque allows calculation of minimum rotation torque required of the motor 1 coupled with the input shaft of the speed reduction device 2 in step SP6.

Further, a current value to be input into the motor for producing the minimum rotation torque is calculated and set by feeding a current setting signal from the CPU 40 to the motor driver 51 in step SP7. In step SP8, the CPU 40 determines whether to terminate the control process. In the case of continuation of the control process, the process returns to step SP2 and the operations between step SP2 and step SP8 are repeatedly performed. The process performed in real time enables the estimation of the load torque and the setting of the current value suitable for the estimated load torque. The control process is brought to a termination in step SP9.

According to the embodiment of the present invention discussed above, load torque is estimated by obtaining slippage in the speed reduction device with elastic bodies 2 from the ratio between the input shaft speed and output shaft speed, and a current value passing through the motor 1 is determined so that the motor 1 produces torque corresponding to the load torque. The estimation of load torque and the determination of current value can keep the generation of rotational torque required against the rotating load at a minimum, thereby minimizing the deterioration of the properties including electricity consumption, heat generation, noise, vibration, rotational variation, and so forth.

The foregoing has described the embodiment of the present invention by referring to the drawings. However the invention should not be limited to the illustrated embodiment. It should be appreciated that various modifications and changes can be made to the illustrated embodiment within the scope of the appended claims and their equivalents.

What is claimed is:

1. A rotation drive system having a speed reduction device with elastic bodies for reducing the rotational speed of a motor by means of frictional contact of the elastic bodies, comprising:

a rotation control unit configured to output an input shaft speed signal to said motor, said input shaft speed signal allows said motor to rotate at a predetermined input shaft speed;

a rotational speed detection unit configured to detect an output shaft speed reduced by said speed reduction device with elastic bodies and configured to output an output shaft speed signal;

a load torque estimation unit configured to estimate a load torque by determining slippage in the speed reduction device based on a reduction ratio of the input shaft speed signal output by said rotation control unit and the output shaft speed signal detected by said rotational speed detection unit and based on a corresponding predetermined reduction ratio under no-load conditions; and a drive control unit configured to control said motor to produce a torque equivalent to the load torque estimated by said load torque estimation unit.

2. The rotation drive system having a speed reduction device with elastic bodies according to claim 1 further comprising storing unit for storing in advance:

data of reduction ratios under no-load conditions between an input shaft speed of said motor and an output shaft speed obtained by reducing the input shaft speed by said speed reduction device with elastic bodies; and data of relations under loaded conditions between slippage generated in said speed reduction device with elastic bodies and load torque, wherein said load torque estimation unit calculates a reduction ratio under loaded conditions based on said input shaft speed signal and said output shaft speed signal, reads out the data of a reduction ratio under no-load conditions from said storing unit, obtains slippage based on the reduction ratio under no-load conditions and the calculated reduction ratio, and reads out load torque corresponding to the slippage from said storing unit; and said drive control unit controls current passing from said rotation control unit to said motor so that said motor produces torque equivalent to said read out load torque.

3. The rotation drive system having a speed reduction device with elastic bodies according to claim 1, wherein said load torque estimation unit estimates said load torque in real time.

4. The rotation drive system having a speed reduction device with elastic bodies according to claim 1, wherein said motor is a stepper motor.

5. The rotation drive system having a speed reduction device with elastic bodies for reducing the rotational speed of a motor by means of frictional contact of the elastic bodies, comprising:

rotation control unit for outputting an input shaft speed signal to said motor, said input shaft speed signal allows said motor to rotate at a predetermined input shaft speed;

rotational speed detection unit for detecting an output shaft speed reduced by said speed reduction device with elastic bodies and outputting an output shaft speed signal;

load torque estimation unit for estimating load torque based on the input shaft speed signal output by said rotation control unit and the output shaft speed signal detected by said rotational speed detection unit;

drive control unit for controlling said motor to produce torque equivalent to the load torque estimated by said load torque estimation unit; and storing unit for storing in advance:

data of reduction ratios under no-load conditions between an input shaft speed of said motor and an output shaft speed obtained by reducing the input shaft speed by said speed reduction device with elastic bodies; and data of relations under loaded conditions between slippage generated in said speed reduction device with elastic bodies and load torque, wherein said load torque estimation unit calculates a reduction ratio under loaded conditions based on said input shaft speed signal and said output shaft speed signal, reads out the data of a reduction ratio under no-load conditions from said storing unit, obtains slippage based on the reduction ratio under no-load conditions and the calculated reduction ratio, and reads out load torque corresponding to the slippage from said storing unit; and said drive control unit controls current passing from said rotation control unit to said motor so that said motor produces torque equivalent to said read out load torque.

6. The rotation drive system having a speed reduction device with elastic bodies according to claim 5, wherein said load torque estimation unit estimates said load torque in real time.

7. The rotation drive system having a speed reduction device with elastic bodies according to claim 5, wherein said motor is a stepper motor.

8. A drive control system for a rotation drive system having a speed reduction device with elastic bodies for reducing rotational speed of a motor, said drive control system comprising:

a rotation control unit configured to output an input shaft speed signal to the motor;

a rotational speed detection unit configured to detect an output shaft speed reduced by the speed reduction device, and configured to output an output shaft speed signal;

a load torque estimation unit configured to estimate a load torque by determining slippage in the speed reduction device based on a reduction ratio of said input shaft speed signal and said output shaft speed signal and based on a corresponding predetermined reduction ratio under no-load conditions; and a drive control unit configured to control the motor to produce a torque equivalent to the load torque estimated by said load torque estimation unit.

9. The drive control system according to claim 8, further comprising:

a storing unit configured to store data regarding a plurality of reduction ratios under loaded conditions and a plurality of corresponding predetermined reduction ratios under no-load conditions, and data regarding slippage generated in the speed reduction device and corresponding load torque.

10. The drive control system according to claim 9, wherein said load torque estimation unit is configured to calculate the reduction ratio by dividing the output shaft speed signal by the input shaft speed signal, to read out the data of the corresponding predetermined reduction ratio from said storing unit based on the calculated reduction ratio, to determine slippage from a difference between the corresponding predetermined reduction ratio and the calculated reduction ratio, and to read out the load torque from said storing unit corresponding to the slippage.

11. The drive control system according to claim 10, wherein said drive control unit is configured to control current passing from said rotation control unit to the motor so that the motor produces torque equivalent to the read out load torque.

* * * * *